(12) United States Patent
Zhang et al.

(10) Patent No.: US 12,035,325 B2
(45) Date of Patent: Jul. 9, 2024

(54) FEEDBACK INFORMATION SENDING METHOD AND APPARATUS AND FEEDBACK INFORMATION RECEIVING METHOD AND APPARATUS

(71) Applicant: Huawei Technologies Co., Ltd., Shenzhen (CN)

(72) Inventors: Jiayin Zhang, Shanghai (CN); Qiong Jia, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 383 days.

(21) Appl. No.: 17/403,615

(22) Filed: Aug. 16, 2021

(65) Prior Publication Data

US 2021/0392675 A1    Dec. 16, 2021

Related U.S. Application Data

(63) Continuation of application No. PCT/CN2020/075537, filed on Feb. 17, 2020.

(30) Foreign Application Priority Data

Feb. 15, 2019  (CN) .......................... 201910117927.6
May 10, 2019  (CN) .......................... 201910390461.7

(51) Int. Cl.
*H04W 72/23* (2023.01)
*H04L 1/1812* (2023.01)
*H04L 5/00* (2006.01)

(52) U.S. Cl.
CPC .......... *H04W 72/23* (2023.01); *H04L 1/1812* (2013.01); *H04L 5/0055* (2013.01)

(58) Field of Classification Search
None
See application file for complete search history.

(56) References Cited

U.S. PATENT DOCUMENTS

2021/0297223 A1* 9/2021 Yang ..................... H04L 1/1614
2021/0376963 A1* 12/2021 Liang .................... H04L 1/1858

FOREIGN PATENT DOCUMENTS

CN    108809524 A    11/2018
CN    109150476 A    1/2019
(Continued)

OTHER PUBLICATIONS

Huawei, HiSilicon, "Feature lead summary of HARQ enhancement in NR-U," 3GPP TSG RAN WG1 Meeting #94, Gothenburg, Sweden, R1-1809921, total 7 pages, 3rd Generation Partnership Project, Valbonne, France (Aug. 20-Aug. 24, 2018).
(Continued)

*Primary Examiner* — Christine T Duong
(74) *Attorney, Agent, or Firm* — Leydig, Voit & Mayer, Ltd.

(57) ABSTRACT

This application provides a feedback information sending method and apparatus and a feedback information receiving method and apparatus. A communications device to which the foregoing methods are applied sends or receives feedback information by using different feedback processes. When a network device does not determine whether a previous piece of feedback information is successfully received, the network device indicates a terminal device to send feedback information of a next piece of downlink data by using a new feedback process, and can schedule the next piece of downlink data without waiting for completion of processing of the previous piece of feedback information, thereby reducing a transmission delay.

27 Claims, 5 Drawing Sheets

(56) References Cited

FOREIGN PATENT DOCUMENTS

| WO | 2018080376 A1 | 5/2018 |
| WO | 2020093336 A1 | 5/2020 |

OTHER PUBLICATIONS

Ericsson, "HARQ enhancements for NR-U," 3GPP TSG-RAN WG1 Meeting #94, Gothenburg, Sweden, R1-1809206, total 7 pages, 3rd Generation Partnership Project, Valbonne, France (Aug. 20-24, 2018).

Huawei, HiSilicon, "HARQ enhancements in NR unlicensed," 3GPP TSG RAN WG1 Meeting #93, Busan, Korea, R1-1805918, total 5 pages, 3rd Generation Partnership Project, Valbonne, France (May 21-May 25, 2018).

"3rd Generation Partnership Project; Technical Specification Group Radio Access Network; NR; Multiplexing and channel coding (Release 15)," 3GPP TS 38.212 V15.4.0, total 100 pages, 3rd Generation Partnership Project, Valbonne, France (Dec. 2018).

"3rd Generation Partnership Project; Technical Specification Group Radio Access Network; NR; Physical layer procedures for data (Release 15)," 3GPP TS 38.214 V15.4.0, total 102 pages, 3rd Generation Partnership Project, Valbonne, France (Dec. 2018).

Huawei, HiSilicon, "HARQ enhancements in NR unlicensed," 3GPP TSG RAN WG1 Meeting #94bis, Chengdu, China, R1-1810128, total 10 pages, 3rd Generation Partnership Project, Valbonne, France (Oct. 8-12, 2018).

"3rd Generation Partnership Project; Technical Specification Group Radio Access Network; NR; Physical layer procedures for control (Release 15)," 3GPP TS 38.213 V15.4.0, total 104 pages, 3rd Generation Partnership Project, Valbonne, France (Dec. 2018).

"3rd Generation Partnership Project; Technical Specification Group Radio Access Network; NR; Physical channels and modulation (Release 15)," 3GPP TS 38.211 V15.4.0, total 96 pages, 3rd Generation Partnership Project, Valbonne, France (Dec. 2018).

MediaTek Inc., "Enhancements on HARQ for NR-U operation," 3GPP TSG RAN WG1 Meeting #94bis, Chengdu, China, R1-1810444, total 6 pages, 3rd Generation Partnership Project, Valbonne, France (Oct. 8-12, 2018).

Intel Corporation, "Enhancements to HARQ for NR-unlicensed," 3GPP TSG RAN WG1 Meeting #94bis, Chengdu, China, R1-1810768, total 4 pages, 3rd Generation Partnership Project, Valbonne, France (Oct. 8-12, 2018).

Qualcomm Incorporated, "Enhancements to Scheduling and HARQ operation for NR-U," 3GPP TSG RAN WG1 Meeting #94bis, Chengdu, China, R1-1811254, total 8 pages, 3rd Generation Partnership Project, Valbonne, France (Oct. 6-Oct. 12, 2018).

Vivo, "Discussion on HARQ operation for NR-U," 3GPP TSG RAN WG1 Meeting #94, Gothenburg, Sweden, R1-1808239, total 3 pages, 3rd Generation Partnership Project, Valbonne, France ( Aug. 20-24, 2018).

Qualcomm Incorporated, "Enhancements to Scheduling and HARQ operation for NR-U," 3GPP TSG RAN WG1 Meeting #AH1901, Taipei, Taiwan, R1-1900875, total 11 pages (Jan. 21-Jan. 25, 2019).

"Potential HARQ enhancements for NR-U," 3GPP TSG-RAN WG1 Meeting Ad Hoc 1901, Taipei, Taiwan, R1-1901000, XP051593845, Total 6 pages, 3rd Generation Partnership Project, Valbonne, France (Jan. 21-25, 2019).

"Potential HARQ enhancements for NR-U," 3GPP TSG-RAN WG1 Meeting #95, Spokane, USA, R1-1813460, XP051555499, Total 5 pages, 3rd Generation Partnership Project, Valbonne, France (Nov. 12-16, 2018).

\* cited by examiner

FEEDBACK INFORMATION SENDING METHOD AND APPARATUS AND FEEDBACK INFORMATION RECEIVING METHOD AND APPARATUS

CROSS-REFERENCE TO RELATED APPLICATIONS

This application is a continuation of International Application No. PCT/CN2020/075537, filed on Feb. 17, 2020, which claims priority to Chinese Patent Application No. 201910117927.6, filed on Feb. 15, 2019 and Chinese Patent Application No. 201910390461.7, filed on May 10, 2019, all of which are hereby incorporated by reference in their entireties.

TECHNICAL FIELD

This application relates to the communications field, and in particular, to a feedback information sending method and apparatus and a feedback information receiving method and apparatus.

BACKGROUND

In a wireless communications system, after sending downlink data to a terminal device, a network device needs to determine, based on feedback information sent by the terminal device, whether the terminal device receives the downlink data. For example, if the terminal device receives the downlink data, the terminal device may send an acknowledgment (ACK); and after receiving the ACK, the network device may determine that the terminal device successfully receives the downlink data. If the terminal device does not receive the downlink data, the terminal device may send a negative acknowledgment (NACK); and after receiving the NACK, the network device may determine that the terminal device does not receive the downlink data.

In some scenarios, when the terminal device successfully receives downlink data, the network device may not learn of the status in time. For example, in NR-based access to unlicensed spectrum (NR-based access to unlicensed spectrum, NR-U), the terminal device fails to send feedback information in time because the terminal device does not preempt an uplink transmission resource. Alternatively, the network device does not demodulate feedback information in time. In this case, the network device needs to wait until the feedback information is received and successfully demodulated, and then determines whether to indicate the terminal device to retransmit the feedback information. Consequently, a transmission delay increases.

SUMMARY

This application provides a feedback information sending method and a feedback information receiving method. Feedback information is sent or received by using different feedback processes. When a network device does not determine whether a previous piece of feedback information is successfully received, the network device indicates a terminal device to send feedback information of a next piece of downlink data by using a new feedback process, and can schedule the next piece of downlink data without waiting for completion of processing of the previous piece of feedback information, thereby reducing a transmission delay.

According to a first aspect, a feedback information sending method is provided, including: receiving first downlink control information, where the first downlink control information includes information indicating first downlink data, information indicating a first uplink resource, and information indicating a first feedback process; and sending first feedback information on the first uplink resource by using the first feedback process, where the first feedback information is used to indicate a reception status of the first downlink data.

A terminal device may send different feedback information by using different feedback processes. In this way, a network device can schedule a next piece of downlink data without determining whether the first feedback information is successfully received, thereby reducing a data transmission delay. In addition, in some communication scenarios, to quickly schedule a next piece of downlink data, the network device indicates, in scheduling information if feedback information of a previous piece of downlink data is not received, the terminal device to retransmit the feedback information of the previous piece of downlink data. Actually, the terminal device may have sent the feedback information of the previous piece of downlink data, but the network device has not yet demodulated the feedback information, resulting in a waste of air interface resources. After the method in the first aspect is applied, the network device may allocate different feedback processes for different downlink data. For example, the network device indicates that the first downlink data corresponds to the first feedback process and that second downlink data corresponds to a second feedback process. If the network device starts to schedule the second downlink data due to a processing delay before the first downlink data is demodulated, the network device indicates the terminal device to send feedback information of the second downlink data by using the second feedback process, and does not indicate, in scheduling information of the second downlink data, whether the first feedback information needs to be retransmitted. When sending the feedback information of the second downlink data, the terminal device does not need to re-send the first feedback information if the terminal device does not receive information that indicates that the first feedback information fails to be received or is successfully received and that is sent by the network device, thereby reducing a waste of air interface resources.

Optionally, the information indicating the first feedback process is a first new feedback indicator NFI and a first physical uplink control channel process identifier PUCCH-ID, the first PUCCH-ID is used to identify the first feedback process, and the first NFI is used to indicate a reception status of feedback information corresponding to the first feedback process or whether only the first feedback information needs to be fed back.

Optionally, the information indicating the first feedback process further includes trigger information (trigger), used to indicate whether second feedback information and the first feedback information need to be combined. The trigger information (trigger) may be a 1-bit field. For example, the field of the trigger information (trigger) is "0", indicating that combination is not required; or the field is "1", indicating that combination is required.

The PUCCH-ID may be a field with a specific value, or may be a field in a specific state. A specific form of the PUCCH-ID is not limited in this application. The NFI may be a field with a size of one bit, and the network device indicates a reception status of the first feedback information by changing a value of the NFI field. For example, when the NFI field is "0", it indicates the first NFI, and when the NFI changes to "1", it indicates a second NFI. The terminal device only needs to determine, based on whether the NFI field changes, whether the first feedback information is successfully received, and does not need to consider a specific value of the NFI field, thereby reducing complexity of determining whether the first feedback information is successfully received.

It should be noted that the first downlink data is scheduled by using the first downlink control information for the first time. Therefore, the terminal device may ignore an indication function of the first NFI to the first downlink data, and only need to store the first NFI, to compare the first NFI with an NFI that corresponds to the first feedback process and that is to be received next time. In addition, if the feedback information related to the first feedback process has been successfully received before the first downlink data is received, the terminal device may ignore an indication function of the first NFI to other downlink data. If the feedback information related to the first feedback process fails to be received before the first downlink data is received, the UE needs to consider the first NFI and determines, based on the first NFI, whether to retransmit feedback information of other downlink data.

Optionally, the method further includes: receiving second downlink control information, where the second downlink control information includes information indicating a second uplink resource and first indication information, and the first indication information is used to indicate that the first feedback information is not successfully received or that the first feedback information needs to be fed back again; and sending the first feedback information on the second uplink resource.

If the network device fails to receive the first feedback information, the network device needs to schedule, by using the second downlink control information, the terminal device to retransmit the first indication information. The second downlink control information includes the information about the second uplink resource, and the information about the second uplink resource is used to allocate or indicate the second uplink resource.

Optionally, the first indication information is the first NFI and the first PUCCH-ID, the first PUCCH-ID is used to identify the first feedback process, and the first NFI is used to indicate that feedback information corresponding to the first PUCCH-ID is not successfully received or that feedback information corresponding to the first PUCCH-ID needs to be fed back again.

When the second downlink control information includes the first NFI and the first PUCCH-ID, it indicates that the feedback information corresponding to the first feedback process is not successfully received by the network device. That is, both the network device and the terminal device determine in advance to indicate that the first feedback information is not successfully received by the network device by keeping the NFI field unchanged.

Optionally, the second downlink control information further includes information indicating the second downlink data, and the method further includes: sending the second feedback information on the second uplink resource by using the first feedback process, where the second feedback information is used to indicate a reception status of the second downlink data.

The second downlink control information may also be used to schedule the second downlink data for transmission, so that the terminal device simultaneously feeds back reception statuses of the first downlink data and the second downlink data. In this way, the network device can be prevented from scheduling uplink resources twice, so that utilization of the uplink resources and feedback efficiency can be improved.

Optionally, the method further includes: receiving third downlink control information, where the third downlink control information includes second indication information, and the second indication information is used to indicate that the first feedback information is successfully received or that the first feedback information does not need to be fed back again.

If the network device successfully receives the first feedback information, the network device may indicate, to the terminal device by using the third downlink control information, that the first feedback information is already successfully received by the network device. The network device may not need to send the second indication information. If the terminal device does not receive indication information indicating that the first feedback information fails to be received, the terminal device can determine that the first feedback information is successfully received by the network device.

Optionally, the second indication information is a second NFI and the first PUCCH-ID, the first PUCCH-ID is used to identify the first feedback process, and the second NFI is used to indicate that the feedback information corresponding to the first feedback process is successfully received or that the first feedback information does not need to be fed back again.

When the second downlink control information includes the second NFI and the first PUCCH-ID, it indicates that the feedback information corresponding to the first feedback process is successfully received by the network device. That is, the terminal device determines, based on a change of the NFI field, that the first feedback information is successfully received by the network device.

Optionally, the third downlink control information further includes information indicating third downlink data and information indicating a third uplink resource, and the method further includes: sending third feedback information on the third uplink resource by using the first feedback process, where the third feedback information is used to indicate a reception status of the third downlink data.

If the network device further needs to schedule the third downlink data, the third downlink control information may be used to schedule the third downlink data. For example, the third downlink control information may include the information indicating the third downlink data, the information indicating the third uplink resource, the information indicating the first feedback process, and the second NFI. In this way, the network device can be prevented from sending downlink control information twice.

Optionally, before the sending third feedback information on the third uplink resource by using the first feedback process, the method further includes: clearing, based on the second indication information, a buffer related to the first feedback process.

After determining that the first feedback information is successfully received by the network device, the terminal device may clear the buffer related to the first feedback process. For example, the terminal device may delete the stored first feedback information, to send feedback information of other downlink data by reusing the first feedback process.

Optionally, the first downlink control information further includes a first downlink assignment indicator DAI, and an association relationship exists between the first DAI and the first feedback process.

When the terminal device sends feedback information by using a dynamic codebook, the dynamic codebook may be determined based on different feedback processes. That is, there is an association relationship between a DAI and a feedback process. A DAI corresponding to each feedback process is calculated independently, thereby reducing logic complexity.

Optionally, before the receiving first downlink control information, the method further includes: receiving configuration information, where the configuration information is used to configure at least two feedback processes, and the at least two feedback processes include the first feedback process.

According to a second aspect, a feedback information detecting method is provided, including: sending first downlink control information, where the first downlink control information includes information indicating first downlink data, information indicating a first uplink resource, and information indicating a first feedback process; and detecting first feedback information on the first uplink resource, where the first feedback information is used to indicate a reception status of the first downlink data, and an association relationship exists between the first feedback information and the first feedback process.

A network device may detect (or receive) different feedback information based on different feedback processes. In this way, the network device can schedule a next piece of downlink data without determining whether the first feedback information is successfully received, thereby reducing a data transmission delay. In addition, in some communication scenarios, to quickly schedule a next piece of downlink data, the network device indicates, in scheduling information when feedback information of a previous piece of downlink data is not received, the terminal device to retransmit the feedback information of the previous piece of downlink data. Actually, the terminal device may have sent the feedback information of the previous piece of downlink data, but the network device has not yet demodulated the feedback information, resulting in a waste of air interface resources. After the method in the second aspect is applied, the network device may allocate different feedback processes for different downlink data. For example, the network device indicates that the first downlink data corresponds to the first feedback process and that second downlink data corresponds to a second feedback process. If the network device starts to schedule the second downlink data due to a processing delay before the first downlink data is demodulated, the network device indicates the terminal device to send feedback information of the second downlink data by using the second feedback process, and does not indicate, in scheduling information of the second downlink data, whether the first feedback information needs to be retransmitted. When sending the feedback information of the second downlink data, the terminal device does not need to re-send the first feedback information if the terminal device does not receive information that indicates that the first feedback information fails to be received or is successfully received and that is sent by the network device, thereby reducing a waste of air interface resources.

Optionally, the information indicating the first feedback process is a first NFI and a first PUCCH-ID, the first PUCCH-ID is used to identify the first feedback process, and the first NFI is used to indicate a reception status of feedback information corresponding to the first feedback process or whether only the first feedback information needs to be fed back.

The PUCCH-ID may be a field with a specific value, or may be a field in a specific state. A specific form of the PUCCH-ID is not limited in this application. The NFI may be a field of a size of one bit, and the network device indicates a reception status of the first feedback information by changing a value of the NFI field. For example, when the NFI field is "0", it indicates the first NFI, and when the NFI changes to "1", it indicates a second NFI. The network device only needs to indicate, by using whether the NFI field changes, whether the first feedback information is successfully received, and does not need to consider a specific value of the NFI field, thereby reducing complexity of indicating whether the first feedback information is successfully received.

Optionally, the method further includes: sending second downlink control information, where the second downlink control information includes information indicating a second uplink resource and first indication information, and the first indication information is used to indicate that the first feedback information is not successfully received or that the first feedback information needs to be fed back again; and detecting the first feedback information on the second uplink resource.

If the network device fails to receive the first feedback information, the network device needs to schedule, by using the second downlink control information, the terminal device to retransmit the first indication information. The second downlink control information includes the information about the second uplink resource, and the information about the second uplink resource is used to allocate or indicate the second uplink resource.

Optionally, the first indication information is the first NFI and the first PUCCH-ID, the first PUCCH-ID is used to identify the first feedback process, and the first NFI is used to indicate that feedback information corresponding to the first PUCCH-ID is not successfully received or that feedback information corresponding to the first PUCCH-ID needs to be fed back again.

When the second downlink control information includes the first NFI and the first PUCCH-ID, it indicates that the feedback information corresponding to the first feedback process is not successfully received by the network device. That is, both the network device and the terminal device determine in advance to indicate that the first feedback information is not successfully received by the network device by keeping the NFI field unchanged.

Optionally, the second downlink control information further includes information indicating the second downlink data, and the method further includes: detecting second feedback information on the second uplink resource, where the second feedback information is used to indicate a reception status of the second downlink data, and an association relationship exists between the second feedback information and the first feedback process.

The second downlink control information may also be used to schedule the second downlink data for transmission, so that the terminal device simultaneously feeds back reception statuses of the first downlink data and the second downlink data. In this way, the network device can be prevented from scheduling uplink resources twice, so that utilization of the uplink resources and feedback efficiency can be improved.

Optionally, the method further includes: sending third downlink control information, where the third downlink control information includes second indication information, and the second indication information is used to indicate that the first feedback information is successfully received or that the first feedback information does not need to be fed back again. If the network device successfully receives the first feedback information, the network device may indicate, to the terminal device by using the third downlink control information, that the first feedback information is already successfully received by the network device. The network device may not need to send the second indication information. If the terminal device does not receive indication information indicating that the first feedback information fails to be received, the terminal device can determine that the first feedback information is successfully received by the network device.

Optionally, the second indication information is a second NFI and the first PUCCH-ID, the first PUCCH-ID is used to identify the first feedback process, and the second NFI is used to indicate that the feedback information corresponding to the first feedback process is successfully received or that the first feedback information does not need to be fed back again.

When the second downlink control information includes the second NFI and the first PUCCH-ID, it indicates that the feedback information corresponding to the first feedback process is successfully received by the network device. That is, the network device indicates, based on a change of the NFI field, that the first feedback information is successfully received by the network device.

Optionally, the third downlink control information further includes information indicating third downlink data and information indicating a third uplink resource, and the method further includes: detecting third feedback information on the third uplink resource, where the third feedback information is used to indicate a reception status of the third downlink data, and an association relationship exists between the third feedback information and the first feedback process.

If the network device further needs to schedule the third downlink data, the third downlink control information may be used to schedule the third downlink data. For example, the third downlink control information may include the information about the third downlink data, the information about the third uplink resource, the information indicating the first feedback process, and the second NFI. In this way, the network device can be prevented from sending downlink control information twice.

Optionally, before the sending third downlink control information, the method further includes: clearing a buffer related to the first feedback process.

After successfully receiving the first feedback information, the network device may clear the buffer related to the first feedback process. For example, the network device may delete the stored first feedback information, to receive feedback information of other downlink data by reusing the first feedback process.

Optionally, the first downlink control information includes a first DAI, and an association relationship exists between the first DAI and the first feedback process.

When the terminal device sends feedback information by using a dynamic codebook, the dynamic codebook may be determined based on different feedback processes. That is, there is an association relationship between a DAI and a feedback process. A DAI corresponding to each feedback process is calculated independently, thereby reducing logic complexity.

Optionally, before the sending first downlink control information, the method further includes: sending configuration information, where the configuration information is used to configure at least two feedback processes, and the at least two feedback processes include the first feedback process.

By configuring a plurality of feedback processes, the network device may indicate, before demodulation of feedback information corresponding to a previous feedback process is completed, the terminal device to transmit feedback information of a new piece of downlink data by using a new feedback process, without waiting for the completion of the demodulation of the feedback information corresponding to the previous feedback process.

According to a third aspect, this application provides a feedback information sending apparatus. The apparatus may be a terminal device or a chip in a terminal device. The apparatus may include a processing unit and a transceiver unit. When the apparatus is a terminal device, the processing unit may be a processor, and the transceiver unit may be a transceiver. The terminal device may further include a storage unit, and the storage unit may be a memory. The storage unit is configured to store an instruction, and the processing unit executes the instruction stored in the storage unit, so that the terminal device performs the method according to the first aspect. When the apparatus is a chip in a terminal device, the processing unit may be a processor, and the transceiver unit may be an input/output interface, a pin, a circuit, or the like. The processing unit executes an instruction stored in a storage unit, so that the terminal device performs the method according to the first aspect. The storage unit may be a storage unit (for example, a register or a buffer) in the chip, or may be a storage unit (for example, a read-only memory or a random access memory) outside the chip in the terminal device.

According to a fourth aspect, this application provides a feedback information receiving apparatus. The apparatus may be a terminal device, or a chip in a terminal device. The apparatus may include a processing unit and a transceiver unit. When the apparatus is a terminal device, the processing unit may be a processor, and the transceiver unit may be a transceiver. The terminal device may further include a storage unit, and the storage unit may be a memory. The storage unit is configured to store an instruction, and the processing unit executes the instruction stored in the storage unit, so that the terminal device performs the method according to the first aspect. When the apparatus is a chip in a terminal device, the processing unit may be a processor, and the transceiver unit may be an input/output interface, a pin, a circuit, or the like. The processing unit executes an instruction stored in a storage unit, so that the terminal device performs the method according to the first aspect. The storage unit may be a storage unit (for example, a register or a buffer) in the chip, or may be a storage unit (for example, a read-only memory or a random access memory) outside the chip in the terminal device.

According to a fifth aspect, this application provides a computer-readable storage medium. The computer-readable storage medium stores a computer program, and when the computer program is executed by a processor, the processor is enabled to perform the method according to the first aspect.

According to a sixth aspect, this application provides a computer-readable storage medium. The computer-readable storage medium stores a computer program, and when the computer program is executed by a processor, the processor is enabled to perform the method according to the second aspect.

According to a seventh aspect, this application provides a computer program product. The computer program product includes computer program code, and when the computer program code is run by a processor, the processor is enabled to perform the method according to the first aspect.

According to an eighth aspect, this application provides a computer program product. The computer program product includes computer program code, and when the computer program code is run by a processor, the processor is enabled to perform the method according to the second aspect.

DESCRIPTION OF EMBODIMENTS

The following describes technical solutions of this application with reference to the accompanying drawings.

Figure 1:
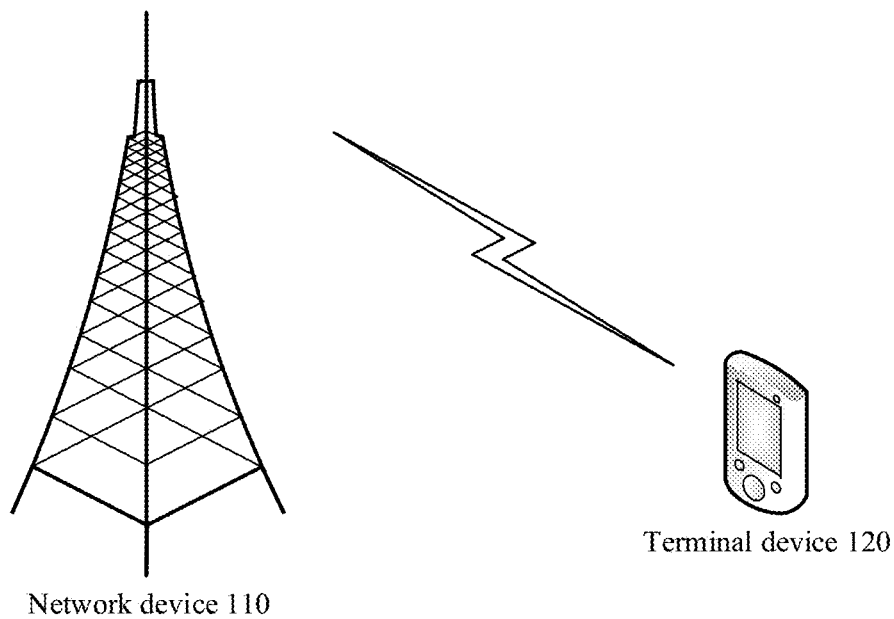
FIG. 1 is a schematic diagram of a communications system applicable to this application.

First, an application scenario of this application is described. FIG. 1 is a schematic diagram of a communications system applicable to this application.

The communications system 100 includes a network device 110 and a terminal device 120. The terminal device 120 communicates with the network device 110 by using an electromagnetic wave.

In this application, the terminal device 120 may include various handheld devices, vehicle-mounted devices, wearable devices, computing devices, or other processing devices connected to a wireless modem, for example, a user equipment (UE) defined in a 3rd generation partnership project (3GPP), a mobile station (MS), a soft terminal, a home gateway, a set-top box, and a site.

The network device 110 may be a base station defined in the 3GPP, for example, a gNB in a fifth generation (5G) communications system. The network device 110 may alternatively be a non-3GPP access network device, for example, an access gateway (AG). The network device 110 may alternatively be a relay station, an access point, a vehicle-mounted device, a wearable device, or a device of another type.

The communications system 100 is merely an example for description, and a communications system applicable to this application is not limited thereto. For example, the communications system 100 may include another quantity of network devices and another quantity of terminal devices.

The communications system 100 may be a system using a licensed spectrum for communication, or may be a system using an unlicensed spectrum for communication. For example, the communications system 100 may be an NR-U system.

A wireless device in the NR-U system usually uses or shares a radio resource by channel listening and contention. Transmitters (gNBs or UEs) use a same or similar principle to fairly contend for a right to use an unlicensed spectrum resource. Usually, before sending a signal, a transmitter first listens to whether an unlicensed spectrum is idle. For example, whether the unlicensed spectrum is busy or idle is determined by using a value of receive power on the unlicensed spectrum. If the receive power is less than a specific threshold, the unlicensed spectrum is considered to be in an idle state, and the signal may be sent on the unlicensed spectrum; if the receive power is equal to or great than a specific threshold, the signal is not sent. This mechanism of listening before sending is referred to as listen before talk (LBT).

Data may be transmitted between UE and a gNB based on a hybrid automatic repeat request (HARQ) process, and each HARQ process corresponds to one transport block (TB). If a TB is not successfully transmitted during initial transmission, a receive end may send feedback information to a transmit end, to indicate that the TB is not successfully received. The transmit end may retransmit all or a part of content of the TB based on the HARQ process, and the receive end may combine a plurality of received data blocks corresponding to the HARQ process, to improve a demodulation success rate.

When communication is performed based on LBT, the UE cannot always send a signal in time due to uncertainty of a channel occupation status. If the UE fails to send a feedback to the gNB in time due to an LBT failure, the gNB considers that the UE fails to correctly demodulate downlink data, and re-schedules a downlink resource for the UE to perform retransmission. Consequently, a waste of downlink resources and an increase in a communication delay are caused.

In addition, regardless of whether the communications system 100 is a system using a licensed spectrum for communication or a system using an unlicensed spectrum for communication, the network device 110 requires some time to demodulate feedback information. For example, in a 5G communications system, the network device 110 requires duration of approximate three slots to demodulate the feedback information. The duration of demodulation is also a part of the communication delay.

Figure 2:
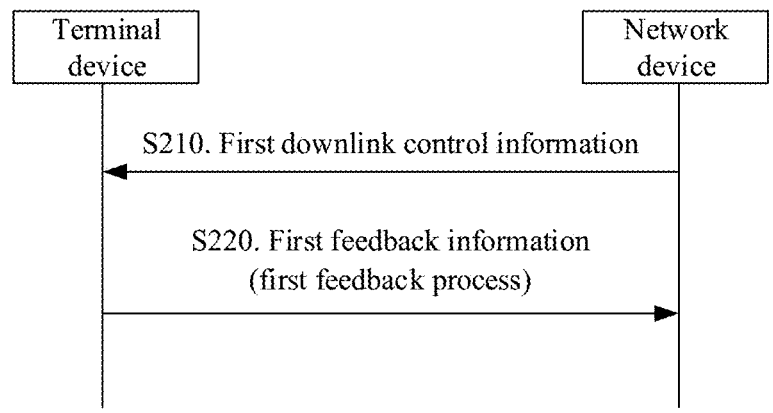
FIG. 2 is a schematic diagram of a feedback information sending and feedback information receiving method according to this application.

To reduce the communication delay, this application provides a feedback information sending method 200. The method 200 may be performed by a terminal device 120. For brevity, no accompanying drawing reference numeral is attached to the following terminal device and network device. As shown in FIG. 2, the method 200 includes the following steps.

S210. Receive first downlink control information, where the first downlink control information includes information indicating (or scheduling) first downlink data, information indicating a first uplink resource, and information indicating a first feedback process. In other words, the first downlink control information includes the information used to schedule the first downlink data, the information about the first uplink resource, and the information indicating the first feedback process.

The information indicating the first downlink data is information required by the terminal device to receive the first downlink data, for example, a time-frequency resource used for transmitting the first downlink data, a modulation and coding scheme (MCS) used for transmitting the first downlink data, and a HARQ process used for transmitting the first downlink data.

The information indicating the first uplink resource is used to allocate or indicate the first uplink resource, so that the terminal device uses the first uplink resource to send feedback information of the first downlink data. For example, the network device may indicate, to the terminal device by using the information about the first uplink resource, a time domain position and a frequency domain position that correspond to the first uplink resource.

The information indicating the first feedback process is used to identify or indicate the first feedback process, so that the terminal device feeds back a reception status of the first downlink data by using the first feedback process. For example, the information indicating the first feedback process may be a first physical uplink control channel process identifier (PUCCH-ID). The information indicating the first feedback process may further include a first new feedback indicator (NFI), and a value of the first NFI is used to indicate whether feedback information corresponding to the first PUCCH-ID is successfully received before the first downlink control information is received, to determine whether the feedback information and the first feedback information need to be simultaneously fed back on the first uplink resource. The NFI may indicate whether only new feedback information (for example, the first feedback information) needs to be fed back on the first uplink resource. If only new feedback information needs to be fed back, it indicates that a previous piece of feedback information is successfully received. If not only new feedback information needs to be fed back, it indicates that a previous piece of feedback information is not successfully received. Then, the terminal may learn whether the feedback information corresponding to the first PUCCH-ID is successfully received before the first downlink control information is received.

It should be noted that, during initial transmission, the network device and the terminal device may determine, according to a preset rule (for example, a rule defined in a communication protocol or a rule preconfigured by the network device), a feedback process based on which feedback information of initially transmitted data is sent. In addition, because feedback information of the first downlink data does not exist during the initial transmission, the first NFI is meaningless during the initial transmission. Therefore, the first downlink control information may not carry the first PUCCH-ID and the first NFI. Alternatively, the first downlink control information includes related fields of the first PUCCH-ID and the first NFI, but the fields of the two pieces of information may be set to invalid fields or may be reused by other information.

The first downlink control information may be downlink control information (DCI), for example, downlink control information in a DCI format 1_0 or a DCI format 1_1. The following shows the first downlink control information including a PUCCH-ID field and an NFI field.

The PUCCH-ID field included in the DCI format 1_0 or the DCI format 1_t may be x bits, and the NFI field included in the DCI format 1_0 or the DCI format 1_1 may be y bits. x and y indicate that specific quantities of bits of the two fields are not limited in this application. For example, a value of x depends on a quantity of feedback processes configured by the network device. If two feedback processes are configured by the network device, a value of x may be 1. A value of y may be 1 or another value.

A cyclic redundancy check (CRC) of the DCI format 1_0 or the DCI format 1_t may be scrambled by using a cell radio network temporary identifier (C-RNTI), a configured scheduling radio network temporary identifier (CS-RNTI), or a new-RNTI.

The terminal device receives the first downlink control information. The terminal device receives the first downlink data on a corresponding downlink resource based on the information about the first downlink data. Then, the terminal device feeds back the reception status of the first downlink data based on a demodulation status of the first downlink data. That is, the following step is performed.

S220. Send the first feedback information by using the first feedback process on the first uplink resource, where the first feedback information is used to indicate the reception status of the first downlink data.

In the foregoing method, the first downlink data may be one piece of data, or may be a plurality of pieces of data. Correspondingly, the first feedback information may be one piece of feedback information, or may be a plurality of pieces of feedback information. Therefore, an association relationship exists between one feedback process and one or more HARQ processes.

For example, the network device schedules a plurality of PDSCHs by using a plurality of pieces of DCI, and these PDSCHs are fed back based on a same PUCCH process. In this case, the plurality of pieces of DCI indicate a same PUCCH-ID. The PUCCH includes feedback information of the plurality of PDSCHs. In other words, a plurality of PDCCHs are used to schedule the plurality of PDSCHs and indicate the same PUCCH-ID, where these PDSCHs are fed back by using the same PUCCH. The PUCCH includes bits of ACKs and NACKs of the plurality of PDSCHs.

Before sending the first feedback information, the terminal device may determine an association relationship between the first feedback process and the first downlink data based on the first downlink control information, and further determine an association relationship between the first feedback process and the first feedback information.

That the terminal device sends the first feedback information by using the first feedback process may be understood as that the terminal device records (or stores) the association relationship between the first feedback process and the first feedback information. In this way, after the terminal device sends the first feedback information, the terminal device receives, from the network device, information (for example, the first PUCCH-ID) that includes the first feedback process. The terminal device determines the reception status of the first feedback information based on the information that includes the first feedback process and that is received from the network device. Further, the terminal device further needs to determine the reception status of the first feedback information by using the NFI. Optionally, the terminal device may alternatively send both the first PUCCH-ID and the first feedback information to the network device.

Therefore, S220 may also be replaced with the following description: sending the first feedback information on the first uplink resource, where the first feedback information is used to indicate the reception status of the first downlink data, and an association relationship exists between the first feedback information and the first feedback process.

The association relationship is also stored in the network device. Because different feedback information corresponds to different feedback processes, the network device can schedule second downlink data after receiving the first feedback information, without waiting for a result of demodulation of the first feedback information. Alternatively, the network device can schedule, without detecting the first feedback information, second downlink data for transmission. Therefore, a communication delay is reduced.

In addition, in some communication scenarios, the terminal device receives two pieces of DCI successively within a short time. The two pieces of DCI are, for example, DCI 1 and DCI 2. The DCI 1 is used to schedule the first downlink data, the DCI 2 is used to schedule the second downlink data, and the DCI 1 is received earlier than the DCI 2. The terminal device has not sent the first feedback information when receiving the DCI 2. Therefore, the DCI 2 carries indication information indicating to retransmit the first feedback information. After sending the first feedback information based on the DCI 1, the terminal device re-sends the first feedback information based on the DCI 2. Consequently, air interface resources are wasted.

After the method 200 is applied, the network device may allocate different feedback processes to the first downlink data and the second downlink data, that is, the first downlink data corresponds to the first feedback process, and the second downlink data corresponds to a second feedback process. When sending feedback information of the second downlink data, the terminal device does not need to re-send the first feedback information if the terminal device does not receive information that indicates that the first feedback information fails to be received and that is sent by the network device, thereby reducing a waste of air interface resources.

In the method 200, after the terminal device sends the first feedback information, the network device detects the first feedback information on the first uplink resource. There are two cases for the reception status of the first feedback information received by the network device: A reception failure and a reception success. The reception failure may be that a signal that carries the first feedback information is detected but the first feedback information is not successfully demodulated, or may be that power of a signal of the first feedback information is excessively small and the network device does not detect the signal that carries the first feedback information, or may be that the terminal device does not send a signal that carries the first feedback information due to an LBT failure. The reception success means that the first feedback information is successfully demodulated. The following separately describes the two cases.

Case 1: The first feedback information fails to be received or the first feedback information needs to be fed back again.

In the case 1, the network device sends second DCI to the terminal device, where the second DCI includes first indication information, used to indicate that the first feedback information fails to be received. The first indication information may be the first NFI. The first NFI is used to indicate a reception status of feedback information corresponding to the first feedback process or whether only the first feedback information needs to be fed back. The first NFI may correspond to the first PUCCH-ID, or an association relationship exists between the first NFI and the first PUCCH-ID. The first PUCCH-ID is used to identify the first feedback process, and the first NFI is used to indicate that the feedback information corresponding to the first PUCCH-ID fails to be received. The first indication information may alternatively be indication information of another type, and a specific form of the first indication information is not limited in this application.

In an example in which the first indication information is the first NFI and the first PUCCH-ID, after receiving the second DCI, the terminal device may determine, according to a predefined rule and based on an NFI field and a PUCCH-ID field that are in first DCI, whether the network device successfully receives the first feedback information or whether the first feedback information needs to be fed back again.

For example, the predefined rule is: For a same feedback process, if an NFI field in the second DCI is different from the NFI field in the first DCI, it indicates that the first feedback information is successfully received or that the first feedback information does not need to be retransmitted. If an NFI field in the second DCI is the same as the NFI field in the first DCI, it indicates that the first feedback information fails to be received or that the first feedback information needs to be retransmitted. The predefined rule may be a rule defined in a communication protocol or may be a rule configured by the network device.

The terminal device determines, based on that the first NFI carried in the first DCI is the same as a second NFI carried in the second DCI, that the first feedback information fails to be received or that the first feedback information needs to be fed back again. Then, the terminal device re-sends the first feedback information on a second uplink resource indicated by the second DCI.

The foregoing predefined rule is merely an example for description. The predefined rule may also be set as follows: For a same feedback process, if the NFI field in the second DCI is the same as the NFI field in the first DCI, it indicates that the first feedback information is successfully received or that the first feedback information does not need to be retransmitted. If the NFI field in the second DCI is different from the NFI field in the first DCI, it indicates that the first feedback information fails to be received or that the first feedback information needs to be retransmitted. Correspondingly, the NFI field in the second DCI also changes.

Optionally, the second DCI may further include information about the second downlink data. The information about the second downlink data is used to schedule the terminal device to receive the second downlink data. After receiving the second DCI, the terminal device may send the first feedback information and second feedback information on the second uplink resource by using the first feedback process, where the second feedback information is used to indicate a reception status of the second downlink data.

Case 2: The first feedback information is successfully received or the first feedback information does not need to be retransmitted.

In the case 2, the network device sends third DCI to the terminal device, where the third DCI includes second indication information, used to indicate that the first feedback information is successfully received or that the first feedback information does not need to be retransmitted. The second indication information may be the second NFI and the first PUCCH-ID, where the first PUCCH-ID is used to identify the first feedback process, and the second NFI is used to indicate that the feedback information corresponding to the first PUCCH-ID is successfully received or that the first feedback information does not need to be retransmitted. The second indication information may alternatively be indication information of another type, and a specific form of the second indication information is not limited in this application.

After receiving the third DCI, the terminal device may determine, according to the predefined rule in the case 1 and based on the NFI field and the PUCCH-ID field that are in the first DCI, that the first feedback information is successfully received or that the first feedback information does not need to be retransmitted. Then, the terminal device clears a buffer related to the first feedback process, to reuse the first feedback process. Correspondingly, after determining that the first feedback information is successfully received, the network device clears the buffer related to the first feedback process.

Optionally, in addition to the second indication information, the third DCI may further include information about third downlink data and information about a third uplink resource. The information about the third downlink data is used to schedule the terminal device to receive the third downlink data, and the information about the third uplink resource is used to allocate or indicate the third uplink resource. After receiving the third DCI, the terminal device may send third feedback information on the third uplink resource by using the first feedback process, where the third feedback information is used to indicate a reception status of the third downlink data.

It should be noted that the terminal device may successively receive the first DCI, the second DCI, and the third DCI. For example, the network device successfully demodulates the first feedback information and the second feedback information on the second uplink resource. In this case, the network device sends the third DCI after sending the second DCI.

Further, before sending the first downlink control information, the network device may further send configuration information. The configuration information is used to configure at least two feedback processes, and the at least two feedback processes include the first feedback process. After the network device sends the first downlink control information or completes transmission of the first feedback information, the network device may send another piece of downlink control information to schedule another feedback process for information transmission.

Figure 3:
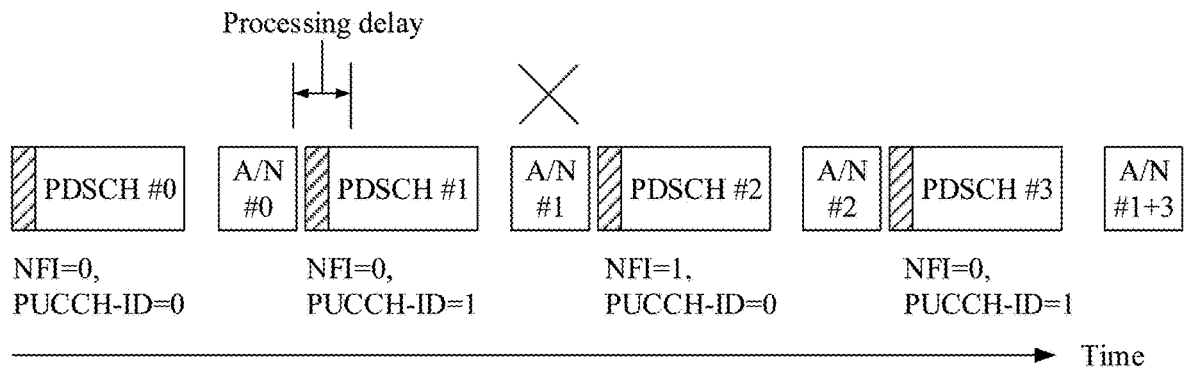
FIG. 3 is a schematic diagram of another feedback information sending and feedback information receiving method according to this application.

FIG. 3 shows an example of a feedback information sending method according to this application.

In FIG. 3, a shadow part represents DCI, and data on a physical downlink shared channel (PDSCH) adjacent to each piece of DCI is downlink data scheduled by using the DCI. A terminal device sends feedback information by using two PUCCH feedback processes.

A network device may indicate a PUCCH feedback process number by using a 1-bit PUCCH-ID field in the DCI, where PUCCH-ID=0 indicates a feedback process 0, and PUCCH-ID=1 indicates a feedback process 1. If the network device has successfully received all feedback information of the terminal device before, NFI fields corresponding to PUCCH-ID=0 and PUCCH-ID=1 are both set to "0".

When scheduling a PDSCH #0, the network device indicates, by using PUCCH-ID=0, the terminal device to feed back, by using a PUCCH feedback process 0, feedback information (A/N #0) corresponding to the PDSCH #0 on a PUCCH resource. When scheduling a PDSCH #1, because processing of the feedback information (A/N #0) corresponding to the PUCCH feedback process 0 is not completed (as shown by a processing delay in FIG. 3), the network device cannot use an NFI corresponding to PUCCH-ID=0 to indicate a reception status of A/N #0. Therefore, the network device indicates, by using PUCCH-ID=1 in DCI for scheduling the PDSCH #1, the terminal device to send feedback information (A/N #1) corresponding to the PDSCH #1 by using the PUCCH feedback process 1. In this case, the network device does not need to consider whether the network device has successfully received A/N #0. Therefore, a scheduling delay of the PDSCH #1 is reduced.

After successfully receiving A/N #0, the network device may reuse the feedback process 0. For example, when scheduling a PDSCH #2, the network device already completes processing of the feedback information (A/N #0) corresponding to PUCCH-ID=0, and correctly receives A/N #0 (regardless of whether A/N #0 is an ACK or a NACK). The network device may toggle an NFI corresponding to the feedback process 0 (where the NFI is set to 1) to indicate, to the terminal device, that feedback of the feedback process 0 has been successfully performed and feedback does not need to be performed again. In addition, the network device clears all historical feedback information corresponding to the feedback process 0. In this way, a buffer storing the HARQ feedback information may be released in time. Optionally, even if historical buffer information corresponding to the feedback process 0 is not cleared, sending feedback information of a new piece of downlink data by continuing to use the feedback process 0 is not affected. In this case, the terminal device needs to send all stored feedback information together.

An interval between a time domain position at which the network device schedules a PDSCH #3 and a time domain position of A/N #1 is greater than a processing delay of the network device. In this case, processing of the process corresponding to PUCCH-ID=1 is completed. Therefore, the feedback process 1 may continue to be used. However, because the network device does not receive the related A/N #1, the network device needs to indicate the terminal device to continue to use the feedback process 1 and does not toggle a previous state of the NFI corresponding to the feedback process 1 (that is, NFI=0), to indicate the terminal device to retransmit the feedback information corresponding to the feedback process 1.

The terminal device may send feedback information of the PDSCH #3 and the feedback information of the PDSCH #1 on a same PUCCH, that is, A/N #1 and A/N #3.

When the terminal device uses a dynamic codebook to feed back a reception status of the downlink data, the network device may include a downlink assignment indicator (DAI) in the DCI, and indicate a feedback process corresponding to the DAI to the terminal device.

For example, when first DCI includes a first DAI and a first PUCCH-ID, an association relationship between the first DAI and a first feedback process is specified. Second DCI and third DCI may also carry a DAI.

When the first DCI includes the first DAI, the first DCI may include a parameter $V_{C\text{-}DAI,c,m,pi}^{DL}$, in the parameter corresponds to a PUCCH-ID field, and the parameter may be used to identify that C-DAI corresponds to PUCCH-ID=pi.

Figure 4:
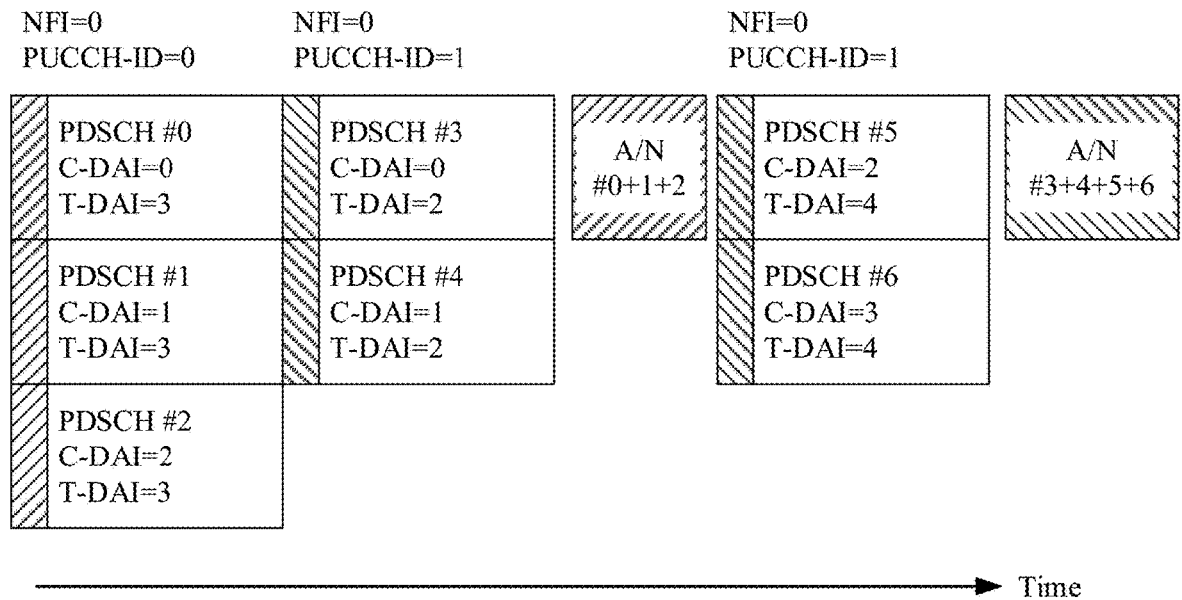
FIG. 4 is a schematic diagram of still another feedback information sending and feedback information receiving method according to this application.

FIG. 4 shows an example of a feedback information sending method according to this application.

When a dynamic codebook is used for feedback, a network device includes a DAI in DCI to indicate, as of a current scheduling periodicity, a total quantity of HARQ processes (that is, a total amount of downlink data) that need to be fed back by a terminal device and a number of a HARQ process currently scheduled by using the DCI in all HARQ processes that need to be fed back. When there are a plurality of feedback processes, the DAI is calculated based only on information about a previously scheduled HARQ process.

In FIG. 4, two shadow rectangles respectively correspond to two feedback processes, a PDSCH #0 to a PDSCH #2 correspond to a feedback process 0 (PUCCH-ID=0), and feedback information (A/N #0+1+2) of the three pieces of downlink data is fed back on the first PUCCH. Numbers of DAIs are shown in the figure, a counter DAI (counter DAI, C-DAI) indicates a DAI corresponding to a current PDSCH, and a total DAI (total DAI, T-DAI) indicates an amount of feedback information that needs to be sent currently. For example, for the PDSCH #0, C-DAI=0 indicates a DAI corresponding to the PDSCH #0, and T-DAI=3 indicates that there are three pieces of feedback information that need to be sent currently, that is, the feedback process 0 corresponds to the three pieces of feedback information.

A PDSCH #3 to a PDSCH #6 use a feedback process 1 (PUCCH-ID=1), and feedback information (A/N #3+4+5+6) of the three pieces of downlink data is fed back on the second PUCCH. Because different feedback processes are used, the DAIs of the PDSCH #0 to the PDSCH #2 do not need to be counted in numbering of DAIs of the PDSCH #3 to the PDSCH #6. In this way, logic complexity is reduced.

For the PDSCH #5 and the PDSCH #6, the feedback process corresponding to the two PDSCHs is the same as the feedback process corresponding to the PDSCH #3 and the PDSCH #4. Therefore, C-DAIs and T-DAIs of the two PDSCHs are related to the PDSCH #3 and the PDSCH #4. To be specific, the C-DAI of the PDSCH #5 is sorted following the C-DAI of the PDSCH #4, and the C-DAI of the PDSCH #6 is sorted following the C-DAI of the PDSCH #5. The T-DAIs of the PDSCH #5 and the PDSCH #6 are equal to a quantity of all PDSCHs corresponding to the feedback process 1, that is, the T-DAIs of the PDSCH #5 and the PDSCH #6 are equal to 4. In other words, for a plurality of PDSCHs having a same feedback process, C-DAIs respectively corresponding to the plurality of PDSCHs may be consecutively numbered, and T-DAIs may be consecutively counted.

In addition, it can be learned from FIG. 4 that, when scheduling the PDSCH #3 to the PDSCH #6, the network device may directly schedule the PDSCH #3 to the PDSCH #6 without waiting for A/N #0+1+2, thereby reducing a transmission delay of downlink data.

Due to uncertainty of LBT or instability of a channel, first feedback information may fail to be received, fail to be sent, or need to be fed back again. For these cases, the present disclosure further provides a feedback information sending method. Specifically, a network device may send trigger information to a terminal device. The trigger information is used to indicate the terminal device to include the first feedback information in a subsequent HARQ feedback. After receiving the trigger information, the terminal device may combine the first feedback information into second feedback information and send combined feedback information to the network device.

When a feedback process corresponding to the first feedback information is the same as a feedback process corresponding to the second feedback information, HARQ feedback may be performed according to a preset rule. The preset rule may be: When the first feedback information needs to be re-sent, the first feedback information is carried in the second feedback information by default. The second feedback information may be considered as uplink control information to be sent after the first feedback information. In other words, because a previous piece of feedback information fails to be sent, a next piece of feedback information directly includes the previous piece of feedback information by default. In this case, the network device may not need to send the trigger information. The terminal device performs feedback according to the preset rule.

When the feedback process corresponding to the first feedback information is the same as the feedback process corresponding to the second feedback information, the terminal device determines, based on the trigger information, whether to include the first feedback information in the second feedback information that is to be sent subsequently. Further, when the trigger information is a first value, the terminal device includes the first feedback information in the second feedback information. When the trigger information is a second value, the terminal device does not include the first feedback information in the second feedback information. The trigger information may be 1-bit information.

Similarly, when both the first feedback information and the second feedback information need to be fed back again, the terminal device may determine, based on the trigger information, whether to include the first feedback information and/or the second feedback information in third feedback information. For more scenarios of feedback information, refer to the foregoing descriptions.

Optionally, the trigger information may be included in information indicating a first feedback process, or may be separate indication information. This is not limited in the present disclosure. For example, the trigger information may be carried in the foregoing second DCI. One bit may be added to the second DCI as the trigger information.

Optionally, the information that indicates the first feedback process and that is sent by the network device may include the trigger information (for example, represented by trigger), to indicate whether the second feedback information and the first feedback information need to be combined. For example, if a field of trigger corresponding to the trigger information is "0", it indicates that combination is not required; if a field is "1", it indicates that combination is required. It should be understood that the second feedback information and the first feedback information herein are logically distinguished from each other and do not constitute a quantity limitation. The second feedback information and the first feedback information may correspond to different feedback processes.

Optionally, the trigger information may be implemented by extending an NFI. For example, the NFI is extended from 1 bit to 2 bits. One bit implements an existing function of the NFI. For details, refer to the predefined rule in the foregoing case 1. The other bit may be used as the trigger information. When a value of the other bit is toggled, it may be considered that the terminal device includes the first feedback information in the second feedback information. When a value of the other bit is not toggled, it may be considered that the terminal device does not include the first feedback information in the second feedback information, it may be considered that the terminal device does not include the first feedback information in the second feedback information.

Further, when the second feedback information carries the first feedback information, ACKs/NACKs in the feedback information may be sorted in a sequence of feedback processes corresponding to the ACKs/NACKs, or may be sorted in a sequence of HARQ processes, or may be sorted in a sequence in which feedback information that needs to be retransmitted may be first sorted and other feedback information is then sorted (certainly, a reverse sequence in which other feedback information may be first sorted and feedback information that needs to be retransmitted may be then sorted may alternatively be used). These sorting manners are not limited in this embodiment of this application.

Figure 4A:
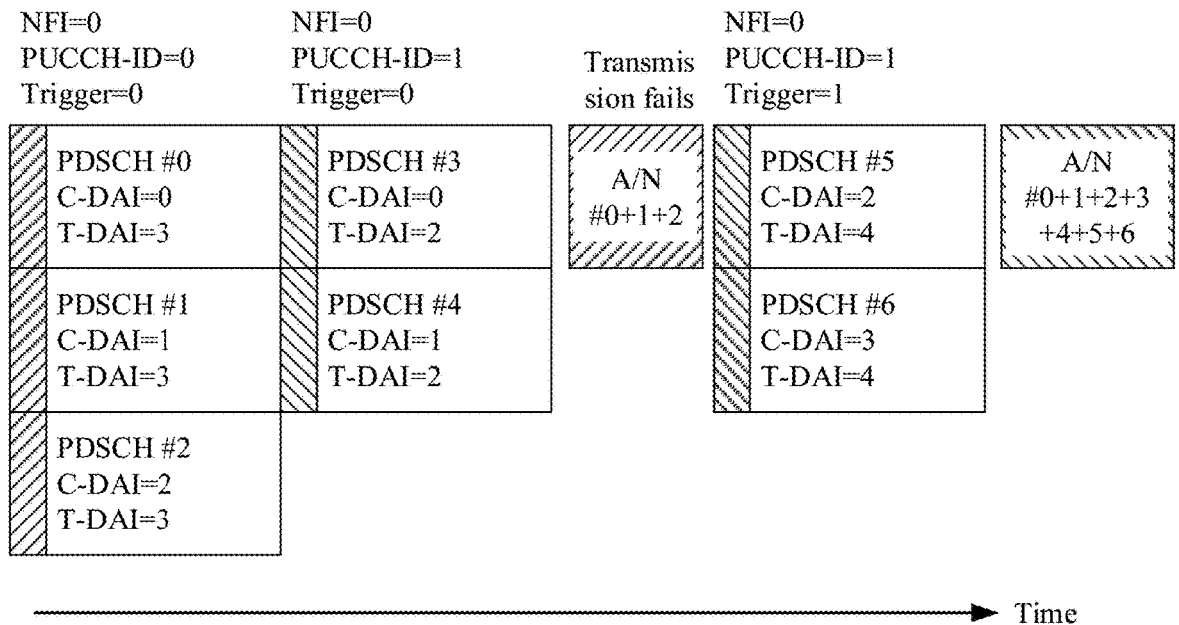
FIG. 4A shows another example of a feedback information sending method according to this application.

FIG. 4A shows another example of a feedback information sending method according to this application.

When a dynamic codebook is used for feedback, a network device includes a DAI in DCI to indicate, as of a current scheduling periodicity, a total quantity of HARQ processes (that is, a total amount of downlink data) that need to be fed back by a terminal device and a number of a HARQ process currently scheduled by using the DCI in all HARQ processes that need to be fed back. When there are a plurality of feedback processes, the DAI is calculated based only on a same feedback process.

It may be understood that, when a PUCCH is transmitted on an unlicensed spectrum, LBT needs to be performed. Due to uncertainty of LBT, the terminal device may fail to transmit the PUCCH because of an LBT failure, or the network device cannot correctly receive the PUCCH due to interference.

In FIG. 4A, two shadow rectangles respectively correspond to two feedback processes, a PDSCH #0 to a PDSCH #2 correspond to a feedback process 0 (PUCCH-ID=0), and feedback information (A/N #0+1+2) of the three pieces of downlink data is fed back on the first PUCCH. For ease of description, feedback information, of all downlink data, corresponding to the feedback process 0 is referred to as first feedback information. Numbers of DAIs are shown in the figure, a counter DAI (counter DAI, C-DAI) indicates a DAI corresponding to a current PDSCH, and a total DAI (total DAI, T-DAI) indicates an amount of feedback information that needs to be sent currently. For example, for the PDSCH #0, C-DAI=0 indicates a DAI corresponding to the PDSCH #0, and T-DAI=3 indicates that there are three pieces of feedback information that need to be sent currently, that is, the first feedback information corresponding to the feedback process 0 includes the three pieces of feedback information (A/N #0+1+2). In this case, the network device indicates, to the terminal by using trigger information (trigger=0), that feedback information does not need to be combined. That is, only the first feedback information needs to be fed back on the first PUCCH.

A PDSCH #3 and a PDSCH #4 use a feedback process 1 (PUCCH-ID=1), indicating that feedback information (A/N #3+4) of the two pieces of downlink data is fed back on the second PUCCH. Feedback information, of all downlink data, corresponding to the feedback process 1 is referred to as second feedback information. Because different feedback processes are used, the DAIs of the PDSCH #0 to the PDSCH #2 do not need to be counted in numbering of DAIs of the PDSCH #3 to the PDSCH #4. In this case, the second feedback information includes two pieces of feedback information (A/N #3+4), and the network device indicates, to the terminal by using trigger information (trigger=0), that feedback information does not need to be combined. That is, only the first feedback information needs to be fed back on the first PUCCH.

For a PDSCH #5 and a PDSCH #6, a feedback process corresponding to the two PDSCHs may be the same as the feedback process corresponding to the PDSCH #3 and the PDSCH #4 (PUCCH-ID=1). That is, feedback information (A/N #3+4+5+6) of the four pieces of downlink data is fed back on the second PUCCH. Because the PDSCH #5 and the PDSCH #6 correspond to the same feedback process as that of the PDSCH #3 and the PDSCH #4, C-DAIs and T-DAIS of the two PDSCHs are related to the PDSCH #3 and the PDSCH #4. To be specific, the C-DAI of the PDSCH #5 is sorted following the C-DAI of the PDSCH #4, and the C-DAI of the PDSCH #6 is sorted following the C-DAI of the PDSCH #5. The T-DAIS of the PDSCH #5 and the PDSCH #6 are equal to a quantity of all PDSCHs corresponding to the feedback process 1, that is, the T-DAIS of the PDSCH #5 and the PDSCH #6 are equal to 4. That is, the second feedback information includes the four pieces of feedback information (A/N #3+4+5+6). In other words, for a plurality of PDSCHs having a same feedback process, C-DAIs respectively corresponding to the plurality of PDSCHs may be consecutively numbered, and T-DAIS may be consecutively counted.

It is assumed that the terminal device fails to send the first PUCCH because of an LBT failure. In other words, the network device does not correctly receive the first feedback information carried on the first PUCCH. In this case, the network device may indicate, by using trigger information trigger=1, the terminal device to send the first feedback information and the second feedback information together on the second PUCCH. Using FIG. 4A as an example, the feedback information of the PDSCH #0 to the PDSCH #2 is not successfully transmitted, and the terminal sends the feedback information of the PDSCH #0 to the PDSCH #6 on a next PUCCH based on the trigger information.

When receiving the trigger information trigger=1, the terminal device can learn that the first feedback information and the second feedback information need to be combined. In this way, feedback information of a plurality of feedback processes is sent together on one PUCCH, thereby reducing overheads.

Figure 4B:
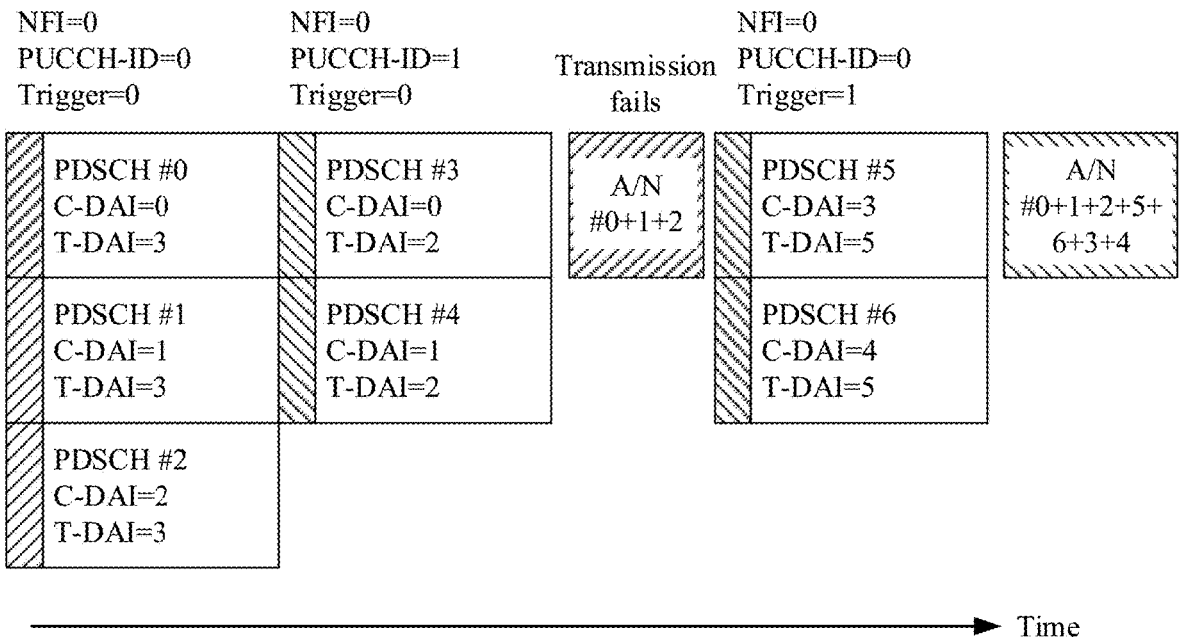
FIG. 4B shows another example of a feedback information sending method according to this application.

Optionally, for the PDSCH #5 and the PDSCH #6, the feedback process corresponding to the two PDSCHs may be the same as the feedback process corresponding to the PDSCH #0 and the PDSCH #1 (PUCCH-ID=0). A specific implementation solution is shown in FIG. 4B. In this case, the first feedback information includes five pieces of feedback information (A/N #0+1+2+5+6). When the first feedback information is not successfully transmitted, the first feedback information needs to be included in the second feedback information based on trigger information. For example, in FIG. 4B, the second feedback information includes the first feedback information and information (A/N #0+1+2+5+6 and A/N #3+4) that originally needs to be fed back in the second feedback information. Certainly, A/N #0+1+2+5+6 and A/N #3+4 may be in any sequence, for example, in a sequence of A/N #0+1+2+5+6+3+4, or in a sequence of A/N #0+1+2+3+4+5+6, or in a sequence of A/N #3+4+0+1+2+5+6.

It should be understood that, for initial PUCCH transmission, one feedback process may correspond to one PUCCH in this embodiment of this application. A plurality of feedback processes may correspond to a plurality of PUCCHs, and there is a one-to-one correspondence therebetween. However, optionally, when PUCCH transmission/reception fails, a network device may indicate a terminal device to transmit feedback information of a plurality of feedback processes on one PUCCH, thereby saving resources, reducing a quantity of times for performing LBT, and improving efficiency.

Similarly, it should be understood that the feedback process mentioned in the present disclosure should also be understood as a logical process, and it does not mean that feedback information corresponding to one feedback process can be transmitted only on one fixed PUCCH resource.

The foregoing mainly describes the feedback information sending methods provided in this application from a perspective of the terminal device. There is a correspondence between a processing process of the network device and a processing process of the terminal device. For example, that the terminal device receives information from the network device means that the network device sends the information. That the terminal device sends information to the network device means that the network device receives the information from the terminal device. Therefore, even if the processing process of the network device is not clearly described in some parts above, a person skilled in the art may clearly understand the processing process of the network device based on the processing process of the terminal device.

The foregoing describes in detail examples of the communication method according to this application. It may be understood that, to implement the foregoing functions, a communications apparatus includes corresponding hardware structures and/or software modules for performing the functions. A person skilled in the art should be easily aware that, in combination with units and algorithm steps in the examples described in the embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In this application, division into functional units may be performed on the foregoing communications apparatus based on the foregoing method examples. For example, each functional unit may be obtained through division based on a function, or two or more functions may be integrated into one processing unit. The integrated unit may be implemented in a form of hardware, or may be implemented in a form of a software functional unit. It should be noted that, in this application, division into units is an example, and is merely logical function division. During actual implementation, another division manner may be used.

Figure 5:
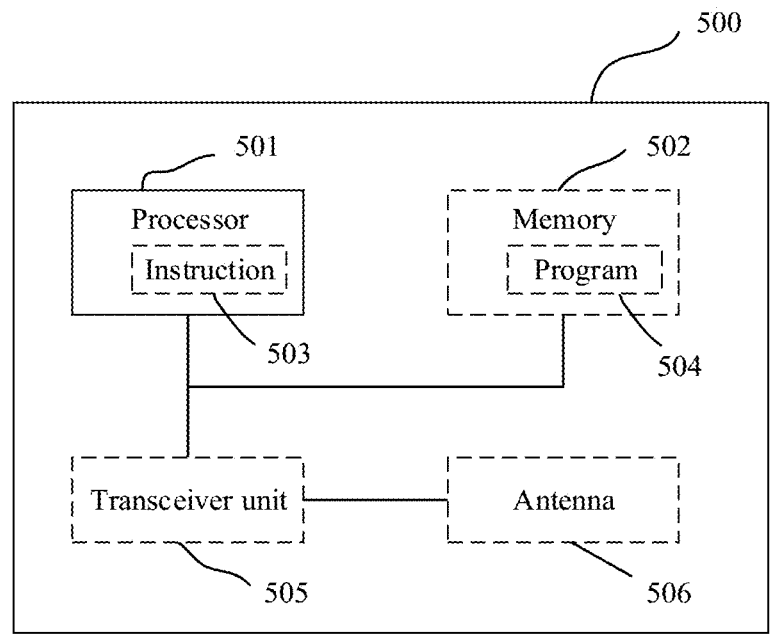
FIG. 5 is a schematic diagram of a communications apparatus according to this application.

FIG. 5 is a schematic structural diagram of a communications apparatus according to this application. The communications apparatus 500 may be configured to implement the methods described in the foregoing method embodiments. The communications apparatus 500 may be a chip, a network device, or a terminal device.

The communications apparatus 500 includes one or more processors 501. The one or more processors 501 may support the communications apparatus 500 in implementing the method in the method embodiment shown in FIG. 2. The processor 501 may be a general-purpose processor, a dedicated processor, or the like. For example, the processor 501 may be a central processing unit (CPU) or a baseband processor. The baseband processor may be configured to process communication data (for example, the foregoing power consumption reduction signal). The CPU may be configured to: control the communications apparatus (for example, a network device, a terminal device, or a chip), execute a software program, and process data of the software program. The communications apparatus 500 may further include a transceiver unit 505, configured to input (receive) and output (send) a signal.

For example, the communications apparatus 500 may be a chip. The transceiver unit 505 may be an input and/or output circuit of the chip, or the transceiver unit 505 may be a communications interface of the chip. The chip may be used as a component of a terminal device, a network device, or another wireless communications device.

The communications apparatus 500 may include one or more memories 502. The memory 502 stores a program 504, and the program 504 may be run by the processor 501 to generate an instruction 503, so that the processor 501 performs, according to the instruction 503, the methods described in the foregoing method embodiments. Optionally, the memory 502 may further store data. Optionally, the processor 501 may further read the data stored in the memory 502. The data and the program 504 may be stored at a same storage address, or the data and the program 504 may be stored at different storage addresses.

The processor 501 and the memory 502 may be disposed separately, or may be integrated together, for example, integrated on a board or integrated into a system on chip (SOC).

The communications apparatus 500 may further include the transceiver unit 505 and an antenna 506. The transceiver unit 505 may be referred to as a transceiver, a transceiver circuit, or a transceiver machine, and is configured to implement a transceiver function of the communications apparatus through the antenna 506.

In a possible design, the processor 501 is configured to perform the following operations through the transceiver unit 505 and the antenna 506:
receiving first downlink control information, where the first downlink control information includes information indicating first downlink data, information indicating a first uplink resource, and information indicating a first feedback process; and
sending first feedback information on the first uplink resource by using the first feedback process, where the first feedback information is used to indicate a reception status of the first downlink data.

In a possible design, the processor 501 is configured to perform the following operations through the transceiver unit 505 and the antenna 506:
sending first downlink control information, where the first downlink control information includes information indicating first downlink data, information indicating a first uplink resource, and information indicating a first feedback process; and
detecting first feedback information on the first uplink resource, where the first feedback information is used to indicate a reception status of the first downlink data, and an association relationship exists between the first feedback information and the first feedback process.

For a specific manner of receiving or sending feedback information, refer to related descriptions in the foregoing method embodiments.

It should be understood that steps in the foregoing method embodiments may be implemented by using a logic circuit in a form of hardware or an instruction in a form of software in the processor 501. The processor 501 may be a CPU, a digital signal processor (DSP), an application-specific integrated circuit (ASIC), a field programmable gate array (FPGA), or another programmable logic device, for example, a discrete gate, a transistor logic device, or a discrete hardware component.

This application further provides a computer program product. When the computer program product is executed by the processor 501, the communication method according to any one of the method embodiments of this application is implemented.

The computer program product may be stored in the memory 502. For example, the computer program product is the program 504. After processing processes such as preprocessing, compilation, assembly, and linking, the program 504 is finally converted into an executable target file that can be executed by the processor 501.

This application further provides a computer-readable storage medium. The computer-readable storage medium stores a computer program. When the computer program is executed by a computer, the communication method according to any one of the method embodiments of this application is implemented. The computer program may be a high-level language program, or may be an executable target program.

The computer-readable storage medium is, for example, the memory 502. The memory 502 may be a volatile memory or a nonvolatile memory, or the memory 502 may include both a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM) that is used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DRRAM).

Figure 6:
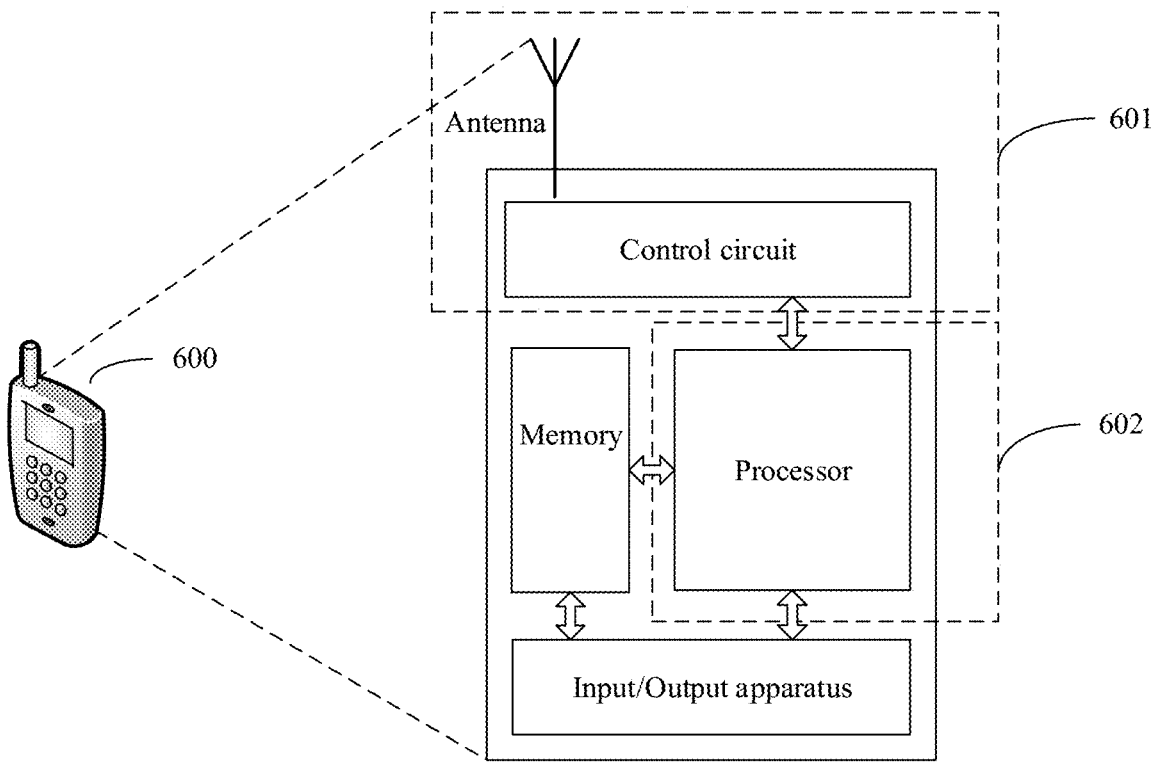
FIG. 6 is a schematic diagram of a terminal device according to this application.

When the communications apparatus 500 is a terminal device, FIG. 6 is a schematic structural diagram of a terminal device according to this application. The terminal device 600 may be used in the system shown in FIG. 1, and perform functions of the terminal device in the foregoing method embodiments. For ease of description, FIG. 6 shows only main components of the terminal device.

As shown in FIG. 6, the terminal device 600 includes a processor, a memory, a control circuit, an antenna, and an input/output apparatus. The processor is mainly configured to: process a communication protocol and communication data, and control the entire terminal device. For example, the processor receives a power consumption reduction signal by using the antenna and the control circuit. The memory is mainly configured to store a program and data, for example, store a communication protocol and to-be-sent data. The control circuit is mainly configured to: perform conversion between a baseband signal and a radio frequency signal, and process the radio frequency signal. A combination of the control circuit and the antenna may be referred to as a transceiver, mainly configured to send and receive a radio frequency signal in an electromagnetic wave form. The input/output apparatus, such as a touchscreen or a keyboard, is mainly configured to: receive data entered by a user, and output data to the user.

After the terminal device is powered on, the processor may read the program in the memory, interpret and execute an instruction included in the program, and process data in the program. When information needs to be sent through the antenna, the processor performs baseband processing on the to-be-sent information, and outputs a baseband signal to a radio frequency circuit. The radio frequency circuit performs radio frequency processing on the baseband signal to obtain a radio frequency signal, and sends the radio frequency signal in an electromagnetic wave form through the antenna. When an electromagnetic wave (namely, the radio frequency signal) carrying information arrives at the terminal device, the radio frequency circuit receives the radio frequency signal through the antenna, converts the radio frequency signal into the baseband signal, and outputs the baseband signal to the processor. The processor converts the baseband signal into the information and processes the information.

A person skilled in the art may understand that for ease of description, FIG. 6 shows only one memory and one processor. Actually, the terminal device may include a plurality of processors and a plurality of memories. The memory may also be referred to as a storage medium, a storage device, or the like. This is not limited in this application.

In an optional implementation, the processor in FIG. 6 may integrate functions of a baseband processor and a CPU. A person skilled in the art may understand that the baseband processor and the CPU may alternatively be independent processors, and are interconnected by using a technology such as a bus. A person skilled in the art may understand that the terminal device may include a plurality of baseband processors to adapt to different network standards, the terminal device may include a plurality of CPUs to improve a processing capability of the terminal device, and the components of the terminal device may be connected by using various buses. The baseband processor may also be referred to as a baseband processing circuit or a baseband processing chip. The CPU may also be referred to as a central processing circuit or a central processing chip. A function of processing the communication protocol and the communication data may be embedded into the processor, or may be stored in the memory in a form of a program, so that the processor executes the program in the memory to implement a baseband processing function.

In this application, the antenna and the control circuit that have sending and receiving functions may be considered as a transceiver 601 of the terminal device 600. The transceiver 601 is configured to support the terminal device in implementing the receiving function in the method embodiments, or is configured to support the terminal device in implementing the sending function in the method embodiments. The processor having a processing function is considered as a processor 602 of the terminal device 600. As shown in FIG. 6, the terminal device 600 includes the transceiver 601 and the processor 602. The transceiver may also be referred to as a transceiver machine, a transceiver apparatus, or the like. Optionally, a component for implementing a receiving function in the transceiver 601 may be considered as a receiver, and a component for implementing a sending function in the transceiver 601 may be considered as a transmitter. In other words, the transceiver 601 includes the receiver and the transmitter. The receiver may also be referred to as a receiver machine, an input port, a receiving circuit, or the like. The transmitter may be referred to as a transmitter machine, an output port, a transmitting circuit, or the like.

The processor 602 may be configured to execute the program stored in the memory, to control the transceiver unit 601 to receive a signal and/or send a signal, to complete a function of the terminal device in the foregoing method embodiments. In an implementation, a function of the transceiver unit 601 may be considered to be implemented by using a transceiver circuit or a transceiver-dedicated chip.

Figure 7:
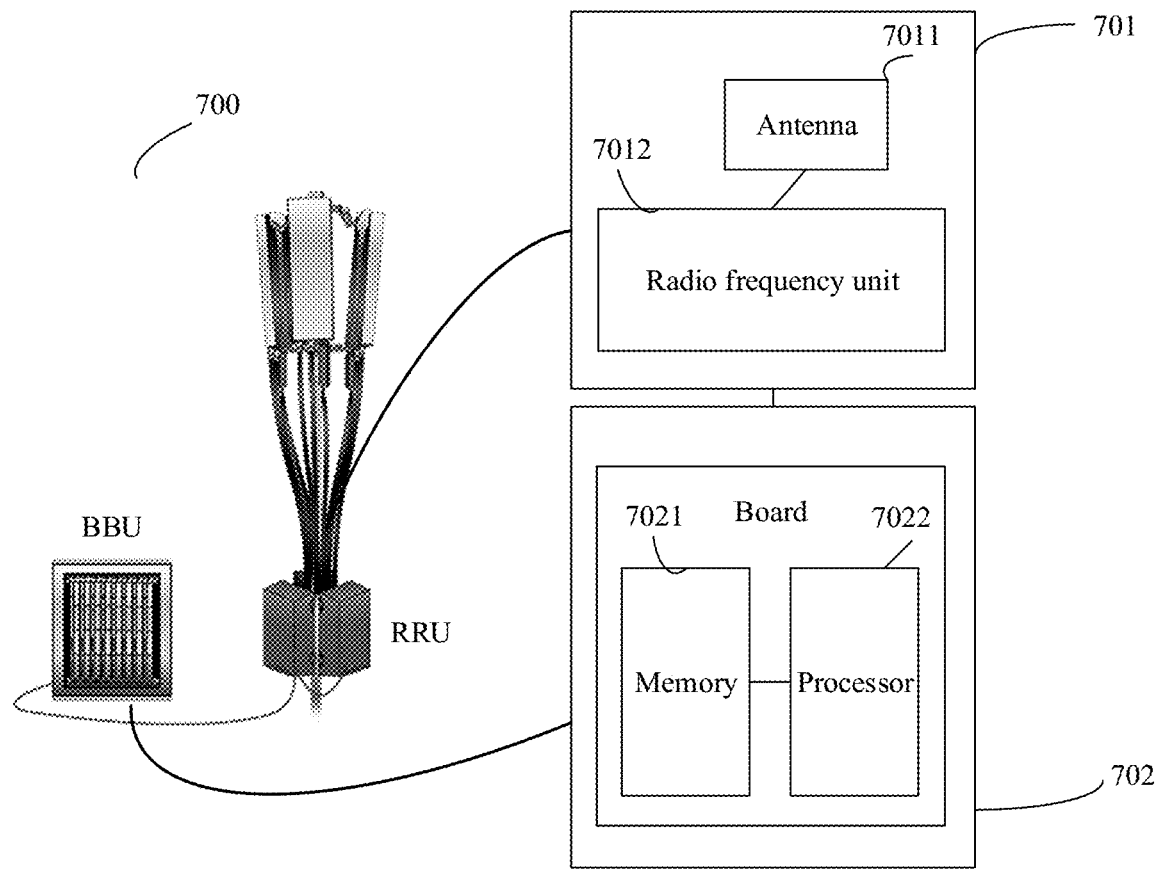
FIG. 7 is a schematic diagram of a network device according to this application.

When the communications apparatus 500 is a network device, FIG. 7 is a schematic structural diagram of a network device according to this application. The network device may be, for example, a base station. As shown in FIG. 7, the base station may be used in the system shown in FIG. 1, to implement a function of the network device in the foregoing method embodiments. The base station 700 may include one or more radio frequency units, for example, a remote radio unit (RRU) 701 and at least one baseband unit (BBU) 702.

The BBU 702 may include a distributed unit (DU), or may include a DU and a central unit (CU).

The RRU 701 may be referred to as a transceiver unit, a transceiver machine, a transceiver circuit, or a transceiver, and may include at least one antenna 7011 and a radio frequency unit 7012. The RRU 701 is mainly configured to perform receiving and sending of a radio frequency signal and conversion between a radio frequency signal and a baseband signal, for example, configured to support the base station in implementing a sending function and a receiving function in the method embodiments. The BBU 702 is mainly configured to: perform baseband processing, control the base station, and the like. The RRU 701 and the BBU 702 may be physically disposed together, or may be physically separately disposed, that is, in a distributed base station.

The BBU 702 may also be referred to as a processing unit, and is mainly configured to complete a baseband processing function such as channel coding, multiplexing, modulation, or spreading. For example, the BBU 702 may be configured to control the base station to perform an operation procedure related to the network device in the foregoing method embodiments.

The BBU 702 may include one or more boards. A plurality of boards may jointly support a radio access network (for example, a long term evolution (LTE) network) of a single access standard, or may separately support radio access networks (for example, an LTE network and an NR network) of different access standards. The BBU 702 further includes a memory 7021 and a processor 7022. The memory 7021 is configured to store a necessary instruction and necessary data. For example, the memory 7021 stores the power consumption reduction signal in the foregoing method embodiments. The processor 7022 is configured to control the base station to perform a necessary action, for example, is configured to control the base station to perform the operation procedure in the foregoing method embodiments. The memory 7021 and the processor 7022 may serve the one or more boards. In other words, a memory and a processor may be independently disposed on each board, or a plurality of boards may share a same memory and a same processor. In addition, a necessary circuit may further be disposed on each board.

It should be noted that the base station shown in FIG. 7 is merely an example, and the network device applicable to this application may alternatively be an active antenna unit (AAU) in an active antenna system (AAS).

It may be clearly understood by a person skilled in the art that, for the purpose of convenient and brief description, for detailed working processes of the foregoing system, apparatus, and unit, refer to corresponding processes in the foregoing method embodiments, and details are not described herein again.

In the several embodiments provided in this application, the disclosed system, apparatus and method may be implemented in other manners. For example, some features of the method embodiments described above may be ignored or not performed. The described apparatus embodiments are merely examples. Division into the units is merely logical function division and may be other division during actual implementation. A plurality of units or components may be combined or integrated into another system. In addition, a coupling between the units or a coupling between the components may be a direct coupling, or may be an indirect coupling. The foregoing coupling includes an electrical connection, a mechanical connection, or a connection in another form.

It should be understood that values of sequence numbers of the foregoing processes do not mean execution sequences in the various embodiments of this application. The execution sequences of the processes should be determined based on functions and internal logic of the processes, and should not be construed as any limitation on the implementation processes of the embodiments of this application.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

In conclusion, the foregoing descriptions are merely example embodiments of the technical solutions of this application, but are not intended to limit the protection scope of this application. Any modification, equivalent replacement, or improvement made without departing from the spirit and principle of this application shall fall within the protection scope of this application.

What is claimed is:

1. A method for sending feedback information, the method comprising:
   receiving first downlink control information, wherein the first downlink control information comprises information indicating first downlink data, information indicating a first uplink resource, and a first identifier, wherein the first downlink data comprises one or more pieces of data, wherein the one or more pieces of data correspond to one or more pieces of hybrid automatic repeat request (HARQ) information, respectively, and wherein each of the one or more pieces of data corresponds to the first identifier;
   generating first feedback information in response to two pieces of first downlink control information having first identifiers that are the same, but values of new feedback indicators (NFIs) in the two pieces of first downlink control information are different; and
   sending the first feedback information on the first uplink resource, wherein the first feedback information comprises the one or more pieces of HARQ information, wherein and the first feedback information is used to indicate a reception status of the first downlink data.

2. The method according to claim 1, wherein the first feedback information comprises HARQ information corresponding to a plurality of pieces of data of the first downlink data corresponding to a plurality of pieces of the first downlink control information, wherein each piece of data in the plurality pieces of data of the first downlink control information comprises the first identifier.

3. The method according to claim 1, wherein the first downlink control information comprises a first downlink assignment indicator (DAD, and a correspondence exists between the first DAI and the first identifier.

4. The method according to claim 3, wherein the one or more pieces of HARQ information comprised in the first feedback information are generated based on the first DAI.

5. The method according to claim 1, wherein the first downlink control information comprises a new feedback indicator (NFI), and wherein the NFI corresponds to the first identifier.

6. The method according to claim 1, further comprising:
sending second feedback information on a second uplink resource, wherein the second feedback information is used to indicate a reception status of second downlink data.

7. The method according to claim 6, wherein the second downlink data comprises one or more pieces of second data, wherein the one or more pieces of second data correspond to one or more pieces of second HARQ information, respectively, and wherein each of the one or more pieces of second data corresponds to a second identifier.

8. The method according to claim 6, further comprising:
receiving trigger information, wherein the trigger information is used to indicate whether the second feedback information and the first feedback information should be combined.

9. The method according to claim 8, wherein a field corresponding to the trigger information is set to 1, indicating that the second feedback information and the first feedback information should be combined.

10. The method according to claim 6, further comprising:
combining the first feedback information with the second feedback information to generate combined feedback information; and
sending the combined feedback information to a network device.

11. The method according to claim 10, wherein
in response to the first feedback information being combined with the second feedback information, sorting acknowledgements/negative acknowledgments (ACKs/NACKs) in the combined feedback information in a sequence of identifiers corresponding to the ACKs/NACKs.

12. An apparatus, comprising:
a memory configured to store instructions; and
one or more processors coupled with the memory, wherein the one or more processors are configured to execute the instructions to cause the apparatus to:
receive first downlink control information, wherein the first downlink control information comprises information indicating first downlink data, information indicating a first uplink resource, and a first identifier, wherein the first downlink data comprises one or more pieces of data, wherein the one or more pieces of data correspond to one or more pieces of hybrid automatic repeat request (HARQ) information, respectively, and wherein each of the one or more pieces of data corresponds to the first identifier;
generate first feedback information in response to two pieces of first downlink control information having first identifiers that are the same, but values of new feedback indicators (NFIs) in the two pieces of first downlink control information are different; and
send the first feedback information on the first uplink resource, wherein the first feedback information comprises the one or more pieces of HARQ information, and wherein the first feedback information is used to indicate a reception status of the first downlink data.

13. The apparatus according to claim 12, wherein the first feedback information comprises HARQ information corresponding to a plurality of pieces of data of the first downlink data corresponding to a plurality of pieces of the first downlink control information, wherein each piece of data in the plurality pieces of data of the first downlink control information comprises the first identifier.

14. The apparatus according to claim 12, wherein the first downlink control information comprises a first downlink assignment indicator (DAT), and a correspondence exists between the first DAI and the first identifier.

15. The apparatus according to claim 14, wherein the one or more pieces of HARQ information comprised in the first feedback information are generated based on the first DAI.

16. The apparatus according to claim 12, wherein the first downlink control information comprises a new feedback indicator (NFI), and wherein the NFI corresponds to the first identifier.

17. A non-transitory computer-readable storage medium storing a program that, when running on a computer, causes the computer to:
receive first downlink control information, wherein the first downlink control information comprises information indicating first downlink data, information indicating a first uplink resource, and a first identifier, wherein the first downlink data comprises one or more pieces of data, wherein the one or more pieces of data correspond to one or more pieces of hybrid automatic repeat request (HARQ) information, respectively, and wherein each of the one or more pieces of data corresponds to the first identifier;
generate first feedback information in response to two pieces of first downlink control information having first identifiers that are the same, but values of new feedback indicators (NFIs) in the two pieces of first downlink control information are different; and
send the first feedback information on the first uplink resource, wherein the first feedback information comprises the one or more pieces of HARQ information, wherein and the first feedback information is used to indicate a reception status of the first downlink data.

18. The non-transitory computer-readable storage medium according to claim 17, wherein the first feedback information comprises HARQ information corresponding to a plurality of pieces of data of the first downlink data corresponding to a plurality of pieces of the first downlink control information, wherein each piece of data in the plurality pieces of data of the first downlink control information comprises the first identifier.

19. The non-transitory computer-readable storage medium according to claim 17, wherein the first downlink control information comprises a first downlink assignment indicator (DAI), and a correspondence exists between the first DAI and the first identifier.

20. The non-transitory computer-readable storage medium according to claim 19, wherein the one or more pieces of HARQ information comprised in the first feedback information are generated based on the first DAI.

21. The non-transitory computer-readable storage medium according to claim 17, wherein the first downlink control information comprises a new feedback indicator (NFI), and wherein the NFI corresponds to the first identifier.

22. The non-transitory computer-readable storage medium according to claim 17, wherein the program when running on the computer, further causes the computer to:
send second feedback information on a second uplink resource, wherein the second feedback information is used to indicate a reception status of second downlink data.

23. The non-transitory computer-readable storage medium according to claim 22, wherein the second downlink data comprises one or more pieces of second data, wherein the one or more pieces of second data correspond to one or more pieces of second HARQ information, respectively, and wherein each of the one or more pieces of second data corresponds to a second identifier.

24. The non-transitory computer-readable storage medium according to claim 22, wherein the program when running on the computer, further causes the computer to:
receive trigger information, wherein the trigger information is used to indicate whether the second feedback information and the first feedback information should be combined.

25. The non-transitory computer-readable storage medium according to claim 24, wherein a field corresponding to the trigger information is set to 1, indicating that the second feedback information and the first feedback information should be combined.

26. The non-transitory computer-readable storage medium according to claim 22, wherein the program when running on the computer, further causes the computer to:
combine the first feedback information with the second feedback information to generate combined feedback information; and
send the combined feedback information to a network device.

27. The non-transitory computer-readable storage medium according to claim 26, wherein the program when running on the computer, further causes the computer to:
in response to the first feedback information being combined with the second feedback information, sort acknowledgements/negative acknowledgments (ACKs/NACKs) in the combined feedback information in a sequence of identifiers corresponding to the ACKs/NACKs.

* * * * *

UNITED STATES PATENT AND TRADEMARK OFFICE
CERTIFICATE OF CORRECTION

PATENT NO. : 12,035,325 B2
APPLICATION NO. : 17/403615
DATED : July 9, 2024
INVENTOR(S) : Zhang et al.

Page 1 of 1

It is certified that error appears in the above-identified patent and that said Letters Patent is hereby corrected as shown below:

In the Claims

Claim 3: Column 26, Line 59: reads as "assignment indicator (DAD, and a correspondence exists" should read as -- assignment indicator (DAI), and a correspondence exists --.

Claim 14: Column 28, Line 3: reads as "assignment indicator (DAT), and a correspondence exists" should read as -- assignment indicator (DAI), and a correspondence exists --.

Signed and Sealed this
Twenty-second Day of April, 2025

Coke Morgan Stewart
*Acting Director of the United States Patent and Trademark Office*